(12) United States Patent
Allison, Sr.

(10) Patent No.: US 7,367,528 B2
(45) Date of Patent: May 6, 2008

(54) AIRPORT SYSTEM FOR OPERATIONS, SAFETY, AND SECURITY

(76) Inventor: Kenneth M. Allison, Sr., 26727 Oak Hill Dr., Spring, TX (US) 77386

( * ) Notice: Subject to any disclaimer, the term of this patent is extended or adjusted under 35 U.S.C. 154(b) by 224 days.

(21) Appl. No.: 10/825,261

(22) Filed: Apr. 14, 2004

(65) Prior Publication Data

US 2005/0247824 A1 Nov. 10, 2005

(51) Int. Cl.
B64C 1/22 (2006.01)
(52) U.S. Cl. ................... 244/137.2; 244/118.6
(58) Field of Classification Search ............ 244/137.1, 244/137.2, 118.6
See application file for complete search history.

(56) References Cited

U.S. PATENT DOCUMENTS

| | | | | |
|---|---|---|---|---|
| 2,053,969 A * | 9/1936 | Olds | ............................ | 220/1.5 |
| 2,095,440 A * | 10/1937 | Hojnowski | ................ | 244/118.1 |
| 2,388,380 A * | 11/1945 | Bathurst | .................... | 244/118.2 |
| 2,407,774 A * | 9/1946 | Fowler | ..................... | 244/118.2 |
| 2,425,499 A * | 8/1947 | Watter | ...................... | 244/118.3 |
| 2,425,972 A * | 8/1947 | Watter | ...................... | 244/118.3 |
| 2,876,969 A * | 3/1959 | Walter et al. | ............. | 244/118.3 |
| 2,931,681 A * | 4/1960 | Keller | ......................... | 254/2 R |
| 3,009,672 A * | 11/1961 | Tharratt | .................... | 244/137.1 |
| 3,028,130 A * | 4/1962 | Burton | ..................... | 244/137.1 |
| 3,055,620 A * | 9/1962 | Weiland | .................. | 244/135 A |
| 3,147,942 A * | 9/1964 | Griffith | ..................... | 244/118.3 |
| 3,150,849 A * | 9/1964 | Conway et al. | .......... | 244/100 R |
| 3,209,929 A * | 10/1965 | Petersen et al. | ............. | 414/676 |
| 3,289,981 A * | 12/1966 | Meyer | ..................... | 244/137.2 |
| 3,368,838 A * | 2/1968 | Reich | ........................ | 294/82.24 |
| 3,381,921 A * | 5/1968 | McDonough et al. | .......... | 410/79 |
| 3,419,164 A * | 12/1968 | O'Neill | ....................... | 414/345 |
| 3,691,595 A * | 9/1972 | Backteman et al. | .......... | 24/287 |
| 3,805,704 A * | 4/1974 | Schauffler | ................ | 104/88.03 |
| 3,872,555 A * | 3/1975 | Link et al. | .................. | 24/590.1 |
| 3,966,285 A * | 6/1976 | Porch et al. | ............. | 312/265.4 |
| 3,972,427 A * | 8/1976 | Stanley et al. | ........... | 244/137.1 |
| 4,301,984 A * | 11/1981 | Olason | ..................... | 244/137.1 |
| 4,355,840 A * | 10/1982 | Szendrodi et al. | .......... | 296/179 |
| 4,379,533 A * | 4/1983 | Caldwell et al. | ......... | 244/118.1 |
| 4,403,803 A * | 9/1983 | Szendrodi et al. | .......... | 296/179 |
| 4,416,435 A * | 11/1983 | Szendrodi et al. | ...... | 244/114 R |
| 5,238,102 A * | 8/1993 | Langer | ........................... | 206/3 |

(Continued)

*Primary Examiner*—Timothy D. Collins
(74) *Attorney, Agent, or Firm*—The Matthews Firm

(57) ABSTRACT

A new and improved airport concept is disclosed herein. Redesigned aircraft would be allowed to dock in the terminal instead of pulling up to loading bridge. The nose section of the aircraft would tilt upwards or to the side, either before or after the aircraft enters the terminal docking station, wherein the passenger compartment would be removed from the aircraft and placed in a deplaning area. Subsequently, a new passenger compartment, fully loaded, would be placed into the plane. Baggage would also be compartmentalized and would be removed through the tail end section of the plane and the next baggage compartment would be put in place. The airport would be laid out in order to minimize passenger traffic and restrict vehicles to emergency and official airport use only. Common use aircraft could be used to accommodate a variety of airline companies flights, and also reduce fuel consumption and time. Dwell time at gates being reduced will mean less gates required to accommodate all aircraft. Terminals will no longer need to be spread out to accommodate more people. New restaurant designs would allow for a food court or restaurant tower.

16 Claims, 11 Drawing Sheets

U.S. PATENT DOCUMENTS

| | | | |
|---|---|---|---|
| 5,240,207 A * | 8/1993 | Eiband et al. | 244/190 |
| 5,816,425 A * | 10/1998 | Keip et al. | 220/4.31 |
| 5,975,464 A * | 11/1999 | Rutan | 244/120 |
| 6,007,025 A * | 12/1999 | Coughren et al. | 244/118.6 |
| 6,260,813 B1 * | 7/2001 | Whitcomb | 248/503.1 |
| 6,281,797 B1 * | 8/2001 | Forster et al. | 340/572.3 |
| 6,494,404 B1 * | 12/2002 | Meyer | 244/118.2 |
| 6,817,579 B2 * | 11/2004 | van der Velden et al. | 244/137.2 |
| 7,000,765 B2 * | 2/2006 | Hase et al. | 206/503 |
| 2002/0153996 A1 * | 10/2002 | Chan et al. | 340/10.4 |
| 2005/0247824 A1 * | 11/2005 | Allison, Sr. | 244/137.2 |
| 2006/0022090 A1 * | 2/2006 | McCoskey et al. | 244/137.1 |
| 2006/0038077 A1 * | 2/2006 | Olin et al. | 244/137.1 |
| 2006/0108477 A1 * | 5/2006 | Helou, Jr. | 244/137.1 |

* cited by examiner

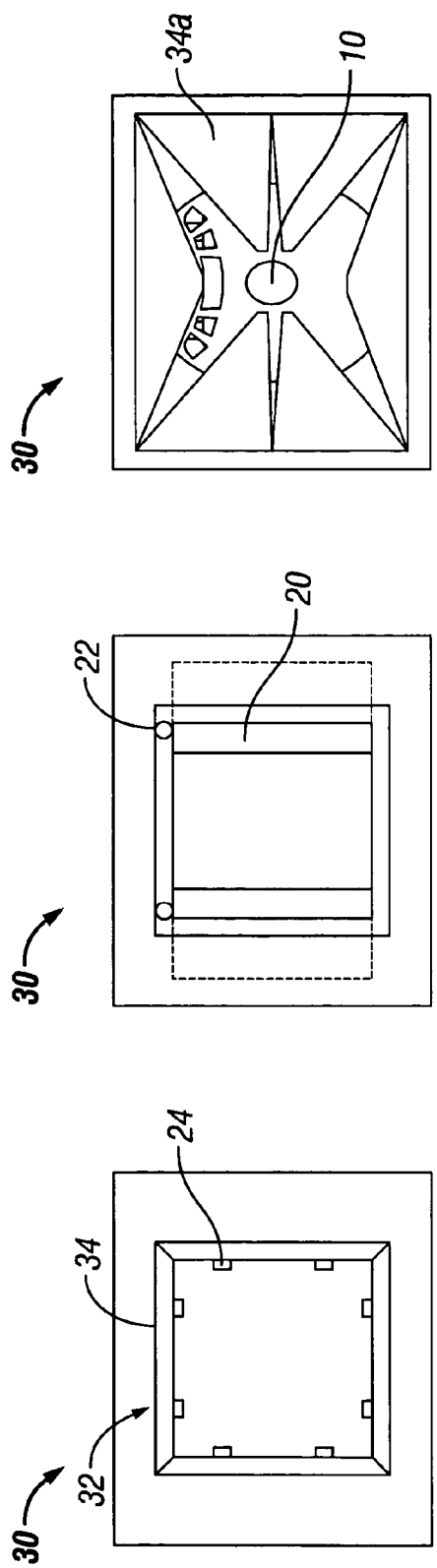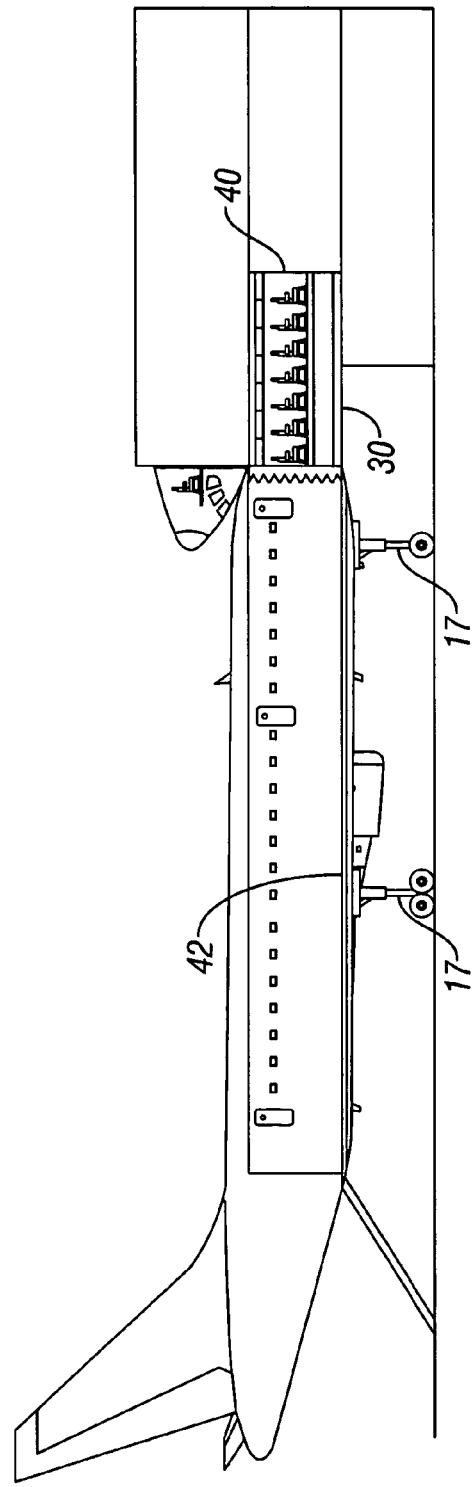

AIRPORT SYSTEM FOR OPERATIONS, SAFETY, AND SECURITY

FIELD OF THE INVENTION

The present invention relates generally to airports. More specifically, the present invention relates to an improvement in the overall airport system including aircrafts, airport layout, the loading and unloading of passengers, providing passenger amenities in both the aircraft and in the airport, and general improvement for the operations, safety, and security of the airport.

BRIEF DESCRIPTION OF THE DRAWINGS

FIG. 3 illustrates a front view of the improved terminal docking station.

FIG. 3A illustrates another embodiment of the terminal docking station having an air curtain and door.

FIG. 3B illustrates a front view of another embodiment of the terminal docking station having a penetratable sealed door.

FIG. 4 illustrates an aircraft docked at a terminal further illustrating the passenger module out of the aircraft.

It should be appreciated that the drawings are not intended to be proportional or to scale and that some elements may be exaggerated to illustrate their presence and some elements may be of a smaller scale to fit in the illustrated drawing. While the present invention will be described in connection with presently contemplated embodiments, it will be understood that it is not intended to limit the invention to those embodiments. Further it should be understood that the drawings used to illustrate these embodiments are also not intended to limit the present invention but are intended to disclose the presently contemplated embodiments. These descriptions and drawings are intended to cover all alternatives, modifications, and equivalents included within the spirit of the invention.

DETAILED DESCRIPTION OF EMBODIMENTS

The aviation industry is relatively new—less than 100 years old. The aircraft, the runways, the airports, and support services have evolved over the years through modifications of the basic concept and infrastructure. The changes to the basic infrastructure has, for the most part, been in response to extensive growth and security demands.

When one thinks of a better way to move people via air transport, one change or modification triggers many changes to the entire airline industry. The business is so huge worldwide that major changes will be difficult to implement due to cost and mind set issues. The present invention provides for the start of major changes to this industry. The very design creates the means to change the entire concept before it becomes even more complex from the sheer volume of people and cargo and from the standpoint of new security problems.

Primarily, airlines and airports make money is by moving people and cargo. The more people and cargo that can be moved in a day's time preferably means more profits for the airlines, possible cheaper fares for the customers, and more profits for the airports. Typically, airports are designed with loading bridges, typically known in the art as jetways, that connect the airport terminal to the aircraft. Passengers board and deplane the aircraft through the loading bridges causing much delay and congestion.

Figure 1:
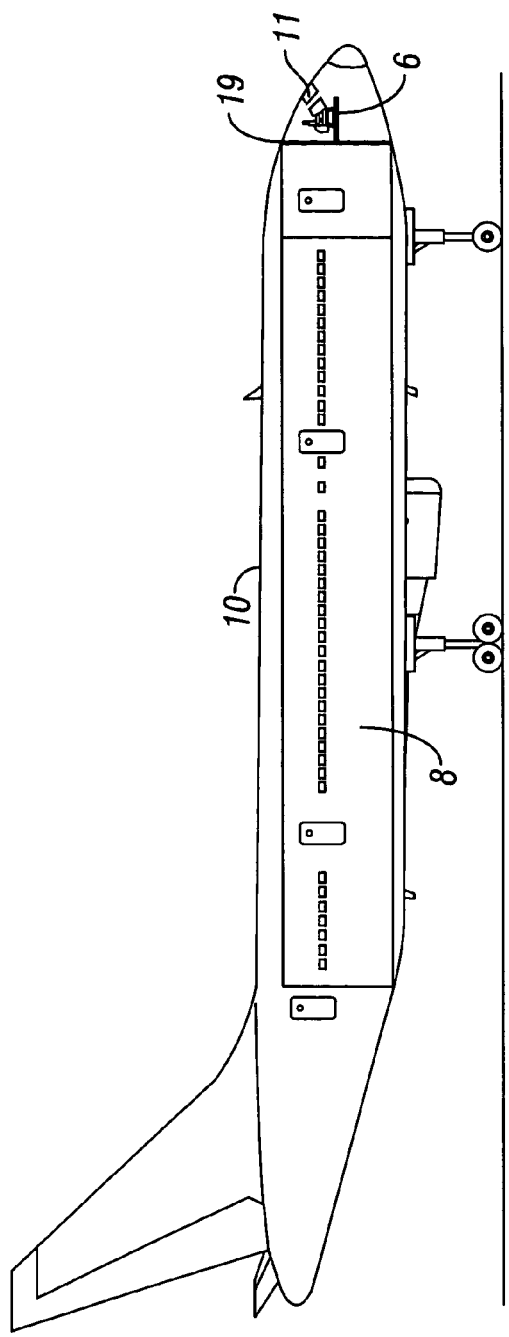
FIG. 1 illustrates an embodiment of the improved passenger aircraft.

FIG. 1 illustrates a typical passenger aircraft 10. Preferably aircraft 10 will be designed so as to allow the nose cone, pilot area, or cockpit area 12 to be opened up, similar to large cargo planes, prior to loading and/or deplaning passengers. The cockpit area will preferably further comprise pilot seats 6, a conventional aircraft windshield 11, and conventional aircraft cockpit controls and instrumentation (not shown). The cockpit area 12 will preferably be separated from the passenger area 8 with a double partition 19. The partition 19 will preferably remain open while the cockpit area 12 is in the conventional or closed position.

Figure 2:
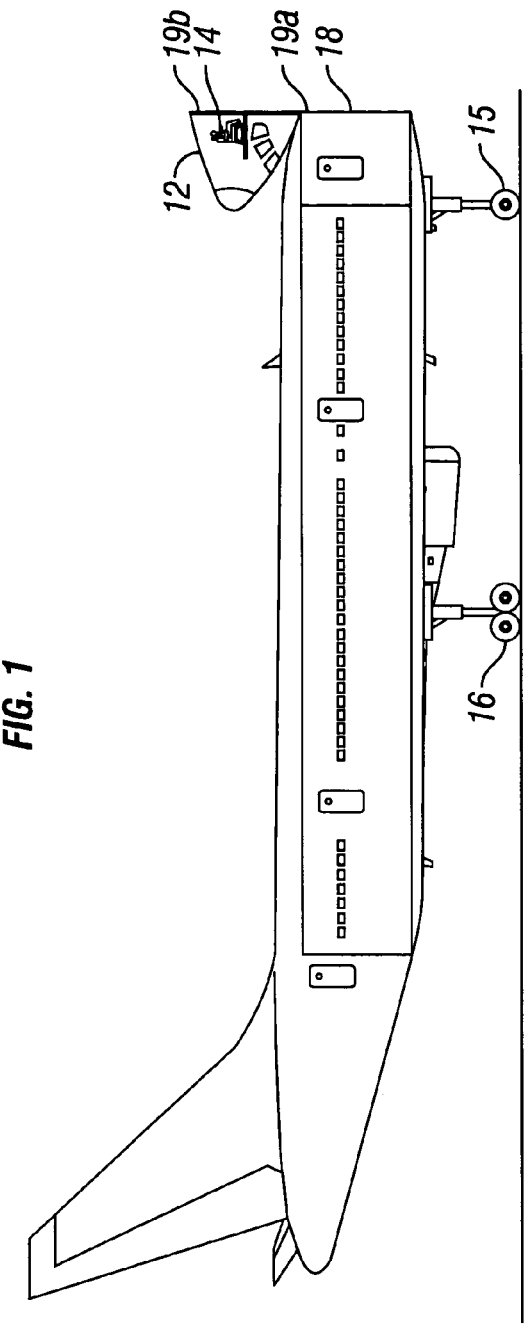
FIG. 2 illustrates an embodiment of the aircraft of FIG. 1 with the cockpit area in the upwardly open position.

FIG. 2 illustrates passenger aircraft 10 with the cockpit area 12 in the open position. Preferably, as the cockpit area 12 is opened, the pilots 14 will remain level, similar to a ferris wheel. Preferably, the pilot seats 6 are locked in a position such that under normal taxi or flying operations, the pilots 14 are positioned such they are facing the front window 11 of the aircraft 10. It should be appreciated that this means that the pilots' 14 line of vision is substantially parallel to the aircraft's forward line of motion. As the cockpit area 12 is maneuvered to the open position, the pilot seats 6 can be unlocked to allow the pilot seats 6 to swivel. The unlocking of the seats 6, is preferably done automatically, through hydraulic controls, electric controls, pneumatic controls, a combination of electric, hydraulic, or pneumatic controls, or other suitable manner. It should be appreciated that the pilot seats 6 can also be unlocked manually. Preferably, the pilot seat swivel motion is accomplished in a conventional manner such that the pilot seats 6 move in tandem with the opening of the cockpit area 12 and allow the pilot seats 6 to remain substantially level (i.e. the pilots 14 line of vision remains substantially parallel to the longitudinal axis of the aircraft). It should be understood that the mechanisms and controls required for the swivelling of the pilots' seats 6 are commercially available and are thus not discussed in detail herein.

Further, referring to FIG. 2, the cockpit area 12 and the passenger compartment opening 18 will preferably become closed off, when the cockpit area is in the open position, by the double partition 19 or other suitable closure mechanism. The double partition 19 is preferably a weather or environmental shield designated with the numeral 19*a*, for the passenger compartment opening 18, and with the numeral 19*b* for the cockpit area 12. It should be appreciated that the shield is preferably opaque for the passenger compartment and clear for the cockpit area 12 since this shield 19*b* will preferably serve as the pilots view port when the cockpit area is in the open position. It should be further appreciated that other closure mechanisms may be used to separate the cockpit area 12 from the passenger compartment 40. It is preferable that the closure for the passenger compartment opening 18 be such that when the cockpit area 12 is moved to the open position, both the passenger compartment 40 and the cockpit area 12 be protected from the elements as well as provide visual capability for the pilots. The visual capability need not be limited to a clear partition 19*b* but may include windows, video cameras, or other sight providing mechanisms. This upright positioning of the pilots 14 will enable the pilots to still maneuver the passenger aircraft 10 even after cockpit 12 has swung into the open position. FIG. 2 further illustrates front landing gear 15 and rear landing gear 16. Preferably, front landing gear 15 and rear landing gear 16 will be adapted with conventional hydraulic extensions in order to raise or lower the aircraft 10. As the passenger aircraft 10 makes its final approach into the docking station, the hydraulically extendable landing gear 15, 16 can adjust the aircraft height to ensure proper alignment between the passenger compartment opening 18 and the deck 53 of the terminal.

Figure 15B:
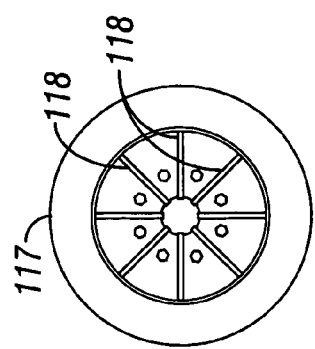
FIG. 15B illustrates a side view of FIG. 15A.
Figure 15A:
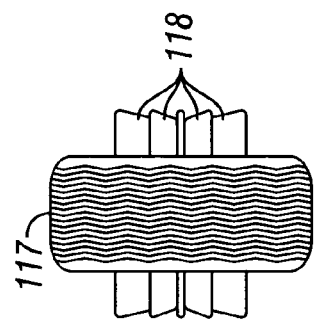
FIG. 15A illustrates another embodiment of the improved landing gear with rotational enhancement fins.
Figure 15:
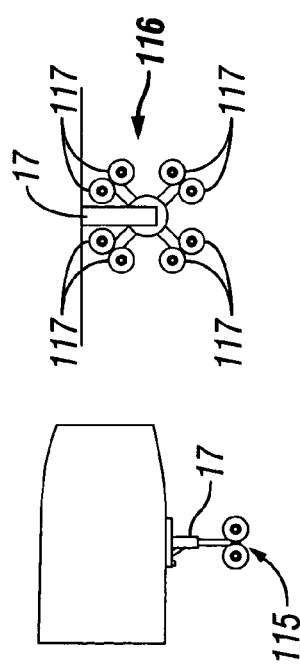
FIG. 15 illustrates an embodiment of an improved landing gear.

FIG. 15 illustrates an embodiment of the present invention wherein the landing gear 115 would have one or more spare sets of wheels 116 that could rotate into place when required such as, but not limited to, due to a tire blowout during takeoff, or some other malfunction in the tire pressure of the landing gear tires. Preferably, the improved landing gear 116 would have two tires/wheels 117, spaced substantially one hundred and eighty (180) degrees apart, such that when low air pressure is indicated in a tire, the landing gear 116 simply rotates and places a new tire 117 in position to be deployed upon landing or takeoff. It should be appreciated that the landing gear 116 can further comprise more than two sets of tires/wheels as illustrated in FIG. 15. It should be further appreciated that the landing gear 116 can further comprise a hydraulic cylinder and system which would allo the landing gear 116 to raise or lower the aircraft 10. The detection of air pressure could be by conventional sensors (not shown) which are built in either to the tire 117 or near the tire 117 which could sense air pressure. Preferably, the tire 117 rotation would be accomplished when the landing gear 116 has been deployed. At that time, the pilots, knowing that the sensor has indicated some defect in the tire 117, could rotate the gear 116 to position a new tire in place for landing. It should be appreciated that the monitoring of the landing gear tires as well as the re-positioning of tires may be accomplished automatically utilizing a conventional computer controlled system.

FIGS. 15A and 15B illustrate another embodiment of the landing gear wheels 119 wherein the wheels 119 are adapted with fins 118. It should be understood that the fins illustrated herein are exaggerated for ease of understanding the fin placement and operation. The fins 118 are preferably disposed about the wheel hubs. The purpose of the fins 118 is to promote rotation of the wheels 119 and thus the tire 117 prior to landing. Preferably, this pre-rotation will lower the stress on both the tires 117 and the wheel bearings (not shown) as the aircraft 10 makes initial contact with the runway upon landing thus enhancing tire longevity and decreasing maintenance and repair costs. Preferably, the fins 118 are such that they are folded away or against the tire 117 during take-offs, landing gear retraction, or at other non-landing operations. When the landing gear 116 is lowered the fins 118 can be deployed and preferably promote the rotation of the wheels 119 and tires 117 in the same rotational direction as when the aircraft 10 is rolling forward. It should be appreciated that the rotational fins 118 can also be utilized with fixed position landing gears, preferably, as long as they can be retracted after take-off.

FIG. 3 illustrates the front view of the improved terminal 30 for docking passenger aircraft 10. As can be seen in FIG. 3, the docking area 32 of the terminal 30 will preferably comprise an opening large enough to accommodate the cockpit area 12 and thus allow the removal and/or loading of the passenger compartment 18. The opening will be preferably covered by sliding doors 20. It should be appreciated that the type of door may include, but not be limited to, sliding doors, a bay door, an overhead door, an upper or lower hinged door, and the like. As the sliding doors 20 are opened, an air curtain 22 will be activated in order to substantially minimize the escape of air conditioning or heating from the dock door to the outside. It should be appreciated that the air curtain 22 is of a conventional design wherein a stream of air may emanate from all sides of the docking opening 34. This blowing stream of air (not shown) will aid in creating a barrier such that the environment, inside the terminal 30, can be substantially maintained. It should be noted that an embodiment of the present invention may include some type of roof, cover, or sleeve which will extend from the terminal over the passenger aircraft 10. After the sliding doors 20 have been opened, the pilots 14 will maneuver the passenger aircraft 10 towards the opening. Such maneuvering may include raising or lowering the hydraulics 17 (see FIG. 4) on front landing gear 15 or rear landing gear 16 as well as moving the aircraft 10 forward.

Once the aircraft 10 pulls into position and even with the dock opening, the docking area 32 will lock against the aircraft. It should be appreciated that the hydraulics 17 are preferably conventional hydraulic cylinders that can be controlled from the cockpit or automatically by conventional computer controls aboard the aircraft.

Preferably, the docking opening 34 will comprise a material softer than the aircraft 10 wherein such material substantially surrounds the perimeter of the docking opening 34. Thus, this softer material will preferably provide a cushion against the aircraft 10 as the docking area 32 is locked against the aircraft 10. It should be appreciated that instead of moving the aircraft 10 under its own power to the docking area 32, after the aircraft 10 has been leveled even with the docking opening 34, it is envisioned that there may be some type of pulley or winch system, track system, a tug cart, or any similar or conventional device for moving an aircraft, that will guide the aircraft for some preferred distance into the terminal docking area 32.

The terminal locking apparatus 24 may be a rollout or slide type device, similar to the conventional terminal loading bridge, which may move out to substantially enclose the front end of passenger compartment opening 18. It should be appreciated that the movement of the locking apparatus 24 is well known to those involved with terminal loading bridges and will not be described in detail herein. After the locking apparatus has moved so as to enclose a pre-determined section of the aircraft 10, preferably conventional hydraulic cylinders (not shown) will actuate the locking apparatus 24 to suitably engage the aircraft 10. After the locking apparatus 24 is suitably engaged with the aircraft 10, the front and rear landing gear 15, 16, will be chocked or blocked into place so that aircraft 10 will not substantially move.

Figure 10:
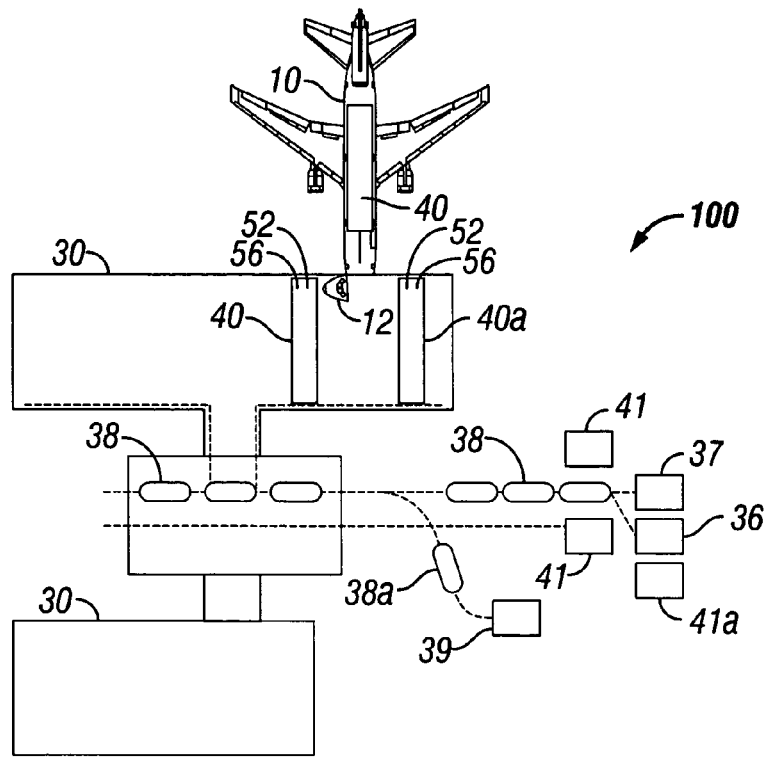
FIG. 10 illustrates a layout of an airport wherein the terminal building is located away from arrival and departure buildings.

It should be noted that the aircraft 10 may pull up to the terminal 30 and push through a curtain, an environmental shield, or some other type of penetratable opening 34a (FIG. 3B). The nose or cockpit area 12 can then be opened upward to the side (FIG. 2A), or can slide to either side (FIG. 2B). It should be appreciated that depending on the specific aircraft design, the opening of the cockpit area 12 can vary. Preferably, a pivotally connected cockpit area 12 my pivot upward or to one side. A slidably connected cockpit area 12 would preferably slide open to one side. Preferably, in an embodiment utilizing the sliding cockpit area 12, the opening or sliding would occur after the aircraft 10 has successfully docked in the terminal 30. In another embodiment, illustrated in FIG. 2C, the cockpit area 12 could be accessed through a split nose 12b. In this embodiment, the aircraft will actually open with the nose cone 12a splitting. In this embodiment, each side of the nose cone 12b will move substantially sideways to allow access to the passenger compartment 40. However, it should be appreciated that many variations of the split nose cone 12b or the slidable or pivoting cockpit area 12 are foreseeable and that these variations should not be viewed as limiting but as being encompassed in the scope of this invention. It should be further appreciated that the terminal 30 can be configured such that the open nose cone section remains outside the terminal (as illustrated in FIG. 4) or that the aircraft 10 can actually dock so that the cone section is substantially inside the terminal 30 (as illustrated in FIG. 10). Thus, when the nose cone or cockpit area 12 opens, substantially the entire cockpit remains within the terminal 30.

The pilots will preferably be allowed to exit after the passenger module 40 has been removed and locked into place in the terminal 30. It should be noted that when preferred or necessary the pilots can exit prior to the removal of the passenger compartment or substantially at the same time. It is envisioned that some type of conventional optical signal (not shown) similar to conventional traffic lights or conventional drive through carwash lights may be used to assist passengers in knowing when it is safe to embark or disembark.

Figure 2A:
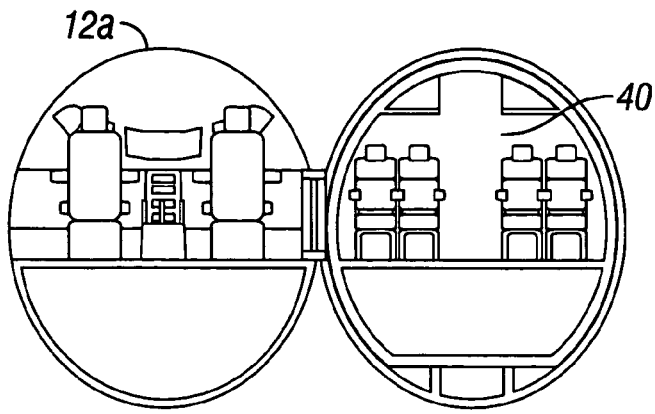
FIG. 2A illustrates another embodiment of an aircraft with a side opening cockpit area.
Figure 2B:
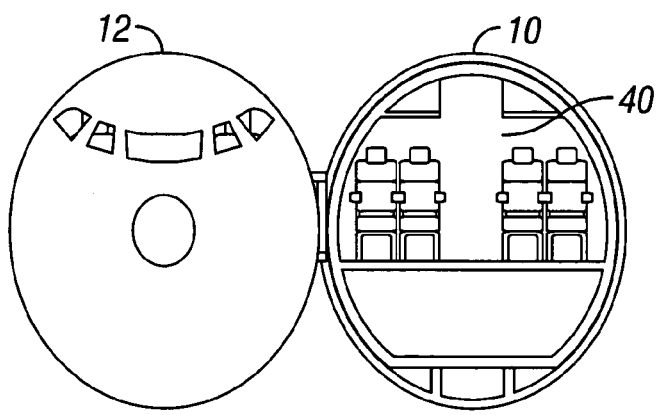
FIG. 2B illustrates another embodiment of an aircraft with a side sliding cockpit area.
Figure 2C:
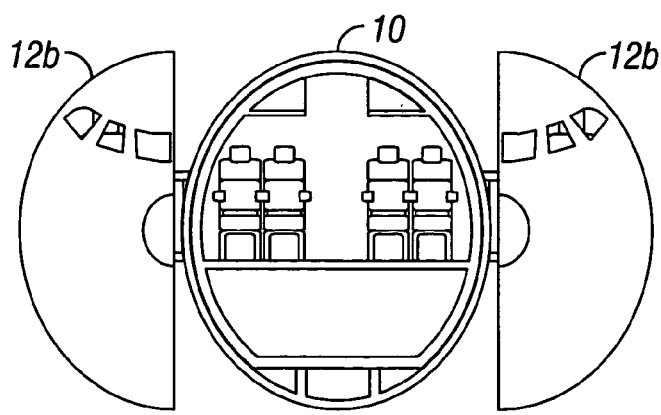
FIG. 2C illustrates another embodiment of an aircraft with a split nose cone opening cockpit area.

FIG. 2A illustrates the side opening of the nose or cockpit area 12 while inside the terminal 30. It should be understood that the terminal 30 may also be configured as to accommodate the upward opening of the nose or cockpit 12 after passing through the penetratable opening 34a. It should be further understood that the side opening cockpit area 12 could also occur prior to final docking, as described herein above for the upwardly opening cockpit area 12. Still further, it is envisioned that the pilots chairs may swivel, during the side opening to allow the pilots to maintain frontal visional view. An alternative embodiment may allow the pilots to have a visual monitor that provides frontal view even when the cockpit area 12 pivots to open to the side.

FIG. 4 illustrates a passenger capsule or compartment 40 of the improved aircraft 10. The passenger capsule or compartment 40 may be of one piece, as illustrated, or may be of multiple sections. Preferably, the passenger compartment will be mounted on a track system 42. It should be appreciated that the track 42 can be a variety of different track designs, including but not limited to, a monorail track, a dual track, a cable system, wheels, air cushions, and the like. It should be noted that a variety of motion means can be utilized including, but not limited to, a cushion of air, pneumatic power, mechanical power, winches, cables, wheels, pulleys, hydraulic power, electric power, magnetic power, or any combination thereof. Once the aircraft 10 has docked and has been secured at the terminal 30, the passenger compartment 40 will be moved from the aircraft into the terminal. Such movement will preferably allow the passengers to remain seated while the entire compartment 40 is removed from the aircraft 10.

Figure 5:
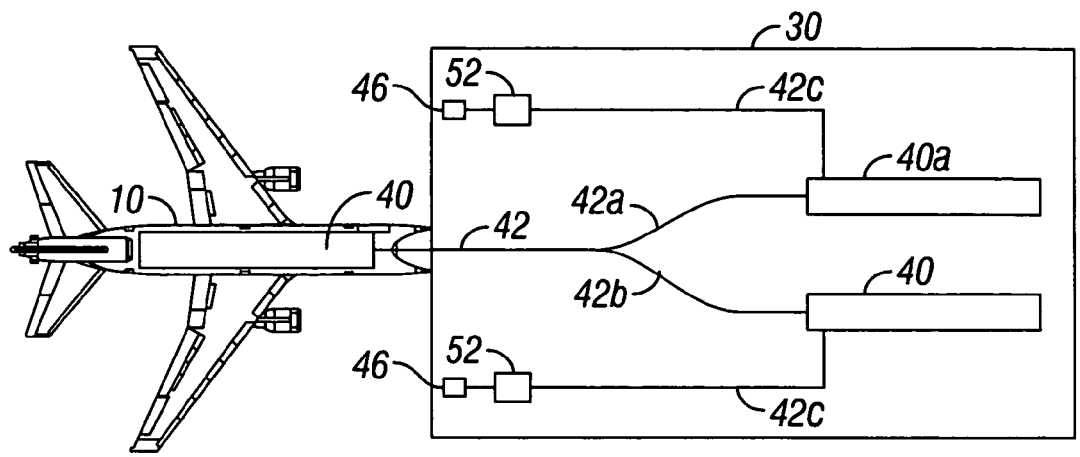
FIG. 5 illustrates a top view of the inside of a terminal with tracks for arriving and departing passenger compartments.

FIG. 5 illustrates an embodiment of the terminal 30 wherein the passenger compartment 40 may be moved to a side track 43b to allow another passenger compartment 40a to be moved inside the aircraft 10. The new passenger compartment 40a will preferably already have the passengers seated in their correct seats and will preferably move from track 42a to track 42 and onto the aircraft 10. It should be understood that the passenger compartment 40 may be locked and unlocked electronically from the aircraft 10 or from the terminal to allow movement of the compartment 40. It should be appreciated that various safety interlocks may be utilized to prevent the compartment from unlocking or moving in unsafe circumstances such as but not limited to, incorrect aircraft positioning or docking, passengers not properly secured in their seats, or personnel being in the way of the passenger compartment. Once the passenger compartment 40 is inside the terminal, it will preferably be routed onto the deplaning track 42b and locked into place so that passengers can stand up and exit the passenger compartment.

Figure 5A:
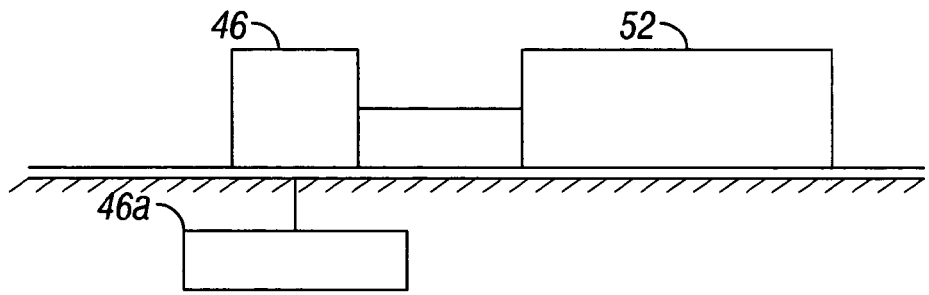
FIG. 5A illustrates further detail of FIG. 5 wherein another embodiment of the sanitation system is illustrated.
Figure 5B:
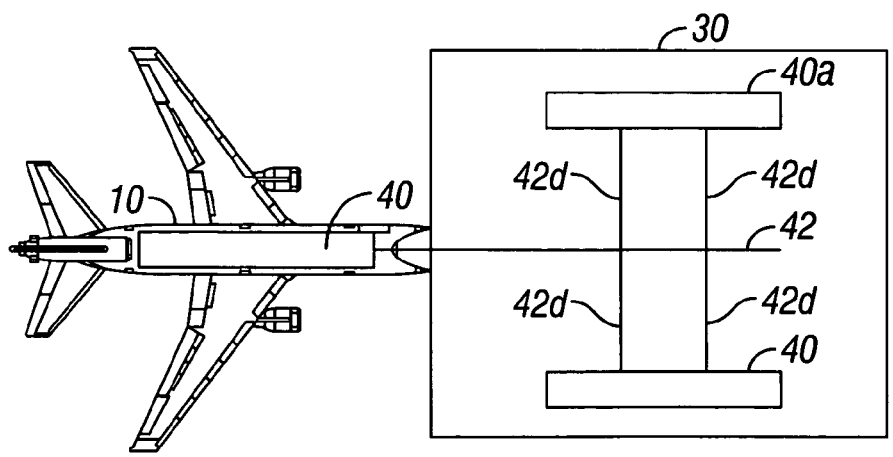
FIG. 5B illustrates another embodiment of a top view of the inside of a terminal with tracks for arriving and departing passenger compartments.

FIG. 5B illustrates another embodiment of terminal 30 wherein the passenger compartment 40, 40a moves into and out of the aircraft 10 along track 42. However, the passenger compartment 40, 40a can be moved sideways along track 42d. As described herein above for track 42, track 42d can also comprise a single track, a monorail track, a dual track, a cable system, wheels, air cushions, and the like. It should be appreciated that the embodiment illustrated in FIG. 5B may require less terminal space and thus be more desirable.

However, it should be appreciated that various embodiments can be foreseen that are hybrids and/or combinations of the embodiments illustrated in FIGS. 5 and 5B and as such should not be viewed in a limiting sense. It should be further appreciated that any food modules 50 or lavatory modules 52 (see FIG. 8) could also be removed from or added to the passenger compartment 40 or the aircraft 10 via the same or similar track system which is utilized for the loading or unloading of the passenger compartment 40. It should be appreciated that the food modules 50 and the lavatory modules 52 can also be independently moved about the terminal 30 and aircraft 10 as well as utilize a variety of other methods of being moved about.

Figure 6:
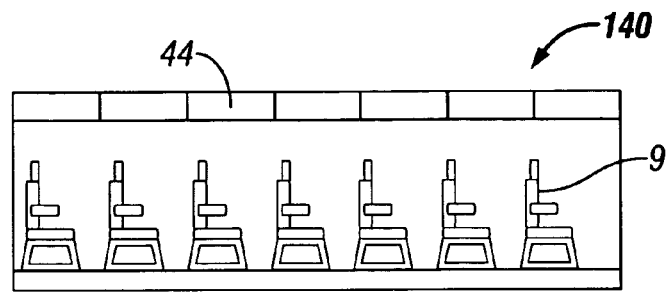
FIG. 6 illustrates an embodiment of the passenger compartment with an overhead compartment separate from the moveable passenger compartment.

FIG. 6 illustrates an embodiment of the passenger compartment 140 wherein conventional aircraft overhead storage compartments 44 are included above the passenger seats 9 within the movable passenger compartment 140. As a passenger deplanes, he can reach into the overhead compartment 44 and remove his baggage as it done in a typical aircraft. It should be appreciated that when the passenger compartment 140 has been moved into the deplaning area, passengers do not have to exit necessarily to the middle aisle. They can exit to the sides and to the end since the compartment will basically be open on all sides.

Figure 6A:
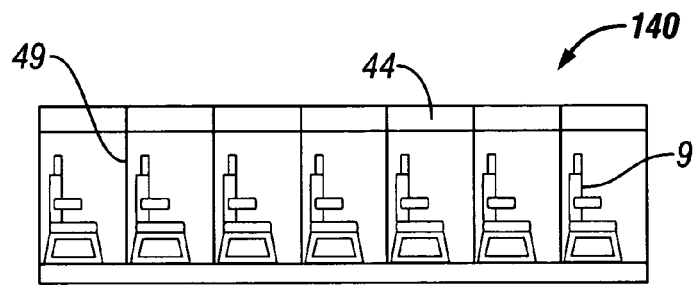
FIG. 6A illustrates an embodiment of the passenger compartment with an overhead compartment integral to moveable passenger compartment and further illustrates a support structure so as to allow passengers to enter or exit the compartment from the side.

It should be understood that the exact configuration of the passenger compartment may vary do to the specific engineering design of the aircraft manufacturer. A support structure must exist in order to support the overhead storage compartments 44 above the passenger seats 9. Such a support may consists of full or partial walls. In a full wall design, the passengers would not be able to freely exit from the sides of the moveable passenger compartment 140. However, in a partial wall design, such as illustrated in FIG. 6A, it is envisioned that supports 49 will preferably be disposed about the interior of the passenger module 140 so as to allow egress and ingress of at least a substantial number of seating rows.

In another embodiment of the present aircraft 10 the overhead compartments 44 will remain stationery in the aircraft 10 with only the passengers seats being moved in and out of the aircraft 10. In this case, the passengers would, of course, have to retrieve any luggage from the overhead compartment before the passenger compartment is moved out of the plane.

Figure 7:
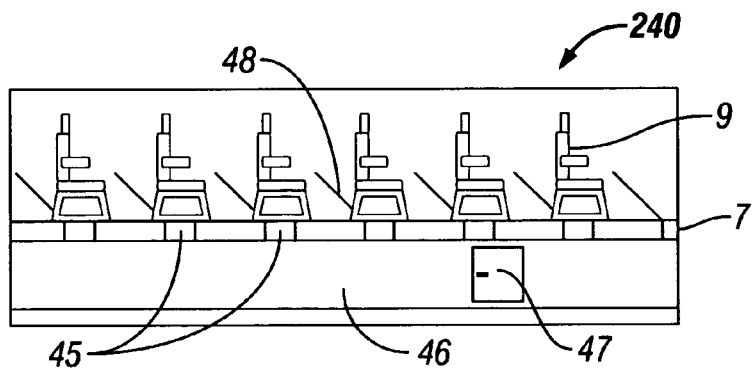
FIG. 7 illustrates an embodiment of the passenger compartment wherein carry-on luggage compartments are below the passenger seat level.
Figure 7A:
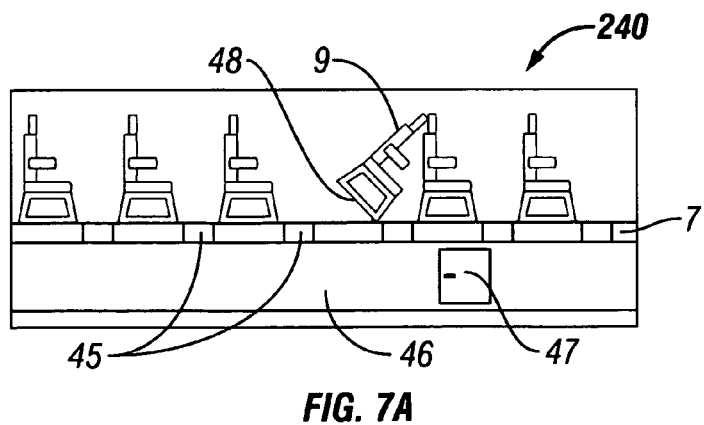

FIG. 7 illustrates another embodiment of the present aircraft design wherein the overhead compartments are removed, the passenger seats 9 are raised, and compartments 46 are placed below the raised passenger seat 9 or the floor 7 for any carry-on luggage. It should be appreciated that when the passengers' carry-on luggage is placed only under his/her own seat or below their feet, the carry-on luggage will preferably remain in the control of the passenger at all times thus preferably enhancing aircraft 10 security. Therefore, when the passenger compartment 240 is removed, so is the personal baggage or carry-on baggage compartment 46 underneath each person's chair. It should be appreciated that the compartment 46 is preferably accessed in two manners. When the passenger compartment 240 is in the terminal 30, either waiting to be loaded into the aircraft 10 or has been unloaded, the personal baggage compartment 46 can be preferably be accessed through a side panel 47 on the side of the passenger compartment 240 or from inside the passenger compartment 240 through access doors 48 located under each passenger's seat 9 or feet. When the passenger compartment 240 is on the aircraft 10, the personal luggage compartment 46 can be accessed through the access doors 48 located under each passenger. It should be appreciated that the access to the baggage compartment 46 can be through a hatch, sliding panel, door, drawer, or the like. It should be further appreciated that when the passenger compartment 240 is out of the aircraft 10, the side opening may not be concealed by doors or panels but may be substantially open except for some restraint, such as but not limited to a netting or straps, to keep the contents from falling out during the movement of the passenger compartment 240 either to or from the aircraft 10.

It should be appreciated that the newly designed carry-on luggage compartments 46 under the seat 9 and/or floor 7 could also be helpful to aid the security of the aircraft 10 as well as the airline/airport customer service. Sensors 45 could be installed in each compartment that send a signal to a panel, either in the cockpit 12 or in the terminal 30 or both with a light, or other suitable alarm, that would come on whenever a passenger left some carry-on luggage in the compartment 46. Thus, it may eliminate a threat to the next group of passengers for that particular passenger compartment 40 or simply alert a passenger that they have forgotten some of their luggage or belongings. It should be appreciated that the passenger compartments 40,40a would provide the additional benefit for airlines to get aircraft 10 back into the air much quicker. This would eliminate the paying of expensive fees to airports based on the time spent on the ground or taking up valuable docking space in the terminal 30.

Preferably in an improved terminal setting, there would be at least one passenger compartment 40a waiting for the arrival of an aircraft 10. Thus, one passenger compartment 40a is preferably loaded before the aircraft 10 arrives at the terminal 30. When the aircraft 10 arrives and docks at the terminal 30, the incoming passenger compartment 40 may be retrieved from the aircraft 10, and the incoming passenger compartment 40 will preferably be placed on a track 42b (FIG. 5). The waiting outgoing passenger compartment 40a will preferably be moved from track 42a onto the just arrived aircraft 10. Thus, the deplaning and boarding of the passenger compartment 40, 40a would eliminate the need to maintain seating areas in the terminal 30. It would open up a lot of space for additional passenger modules 40, 40a which could be staged to speed up the process. Preferably, substantially reducing the wait time between deplaning and boarding.

This time reduction is preferably due in part because after an incoming passenger compartment 40 has been emptied inside a terminal deplaning area, cleaning crews could easily and quickly clean up the passenger compartment 40 and have it ready for a new group of passengers who would be boarding another aircraft 10.

It should be appreciated that as new passengers are brought in to be loaded onto the passenger compartment 40a, instead of sitting in a lobby in the terminal 30 they would take their assigned seats in the passenger compartment 40a. Since the passenger compartment 40a is preferably open on all four sides, there would be no problems in moving around or people wanting to leave their seat temporarily, since exits will be on all sides. Another time consuming issue in loading passengers is the tradition of loading children, parents with small children, disabled persons or aged persons onto the flight. With the passenger compartment 40a open in the terminal, it will no longer be necessary to have to load groups individually as access to all seating will be easily available. Therefore, with their assigned seats, any assignments for pre-loading types of people will be accomplished early. Thus, people can just take their seats.

Figure 16:
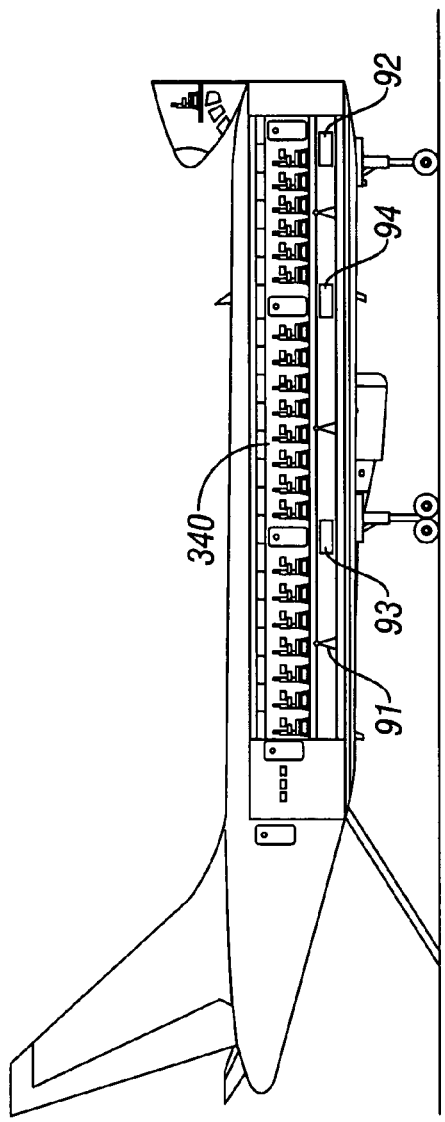
FIG. 16 illustrates an embodiment of an aircraft having an automated positioning system for the passenger compartment.

A further embodiment of the passenger compartment 40 may comprise a compartment that can swivel and is preferably controlled by a conventional gyroscope. Therefore, when the aircraft 10 tilts or banks in making a turn, the passenger compartment 40 will react or move to keep passengers substantially level at all times. This embodiment will increase the comfort of the passengers as well as avoid accidents that result from sudden turns of the aircraft 10. FIG. 16 illustrates such an embodiment wherein the passenger compartment 340 is supported by a series of supports 91. It should be appreciated that the supports 91 preferably separate the passenger compartment 340 from the aircraft fuselage on substantially all sides. The supports 91 are hydraulically controlled by a conventional hydraulic system 93 capable of precise hydraulic cylinder control. A conventional gyroscope 92 preferably sends signals to a conventional computer control system 94. The computer control system 94 preferably determines or calculates the amount of swivel necessary to maintain the passenger compartment 340 in a level position preferably based on the signals received from the gyroscope 92. The computer preferably, then transmits signals to the hydraulic control system to energize the hydraulic cylinders of the support 91 to maintain the passenger compartment 340 level.

A further advantage of the passenger compartment 40, is that during inspection of the aircraft 10, the compartment 40 can easily be removed. Thus, inspectors can easily inspect the internals of the aircraft 10 for cracks, stresses and other aircraft problems which jeopardize the integrity of the aircraft 10. The inspections could be quicker and also better equipment can be brought in to inspect the aircraft 10.

In another embodiment, of the present invention, the passenger compartment 40 would preferably be substantially encapsulated so as to form a separate pod from the aircraft 10. This embodiment would preferably find most acceptance for overseas flights or flights over other bodies of water. However, it can also be utilized for other flights and find use as an aid in alleviating some aspect of otherwise catastrophic accidents. Thus, it is envisioned that the passenger compartment 40, not only being able to rotate with the aid of a gyroscope 92 to maintain a substantially level position, but in the event of a sea crash the compartment 40 would also be capable of floating. Therefore, should the aircraft 10 land or crash in water, the compartment 40 could be ejected from the aircraft body or aircraft fuselage. The ejected compartment 40 would be airtight and waterproof and thus would float. It is envisioned that some type of safety beacon and radar emissions would be transmitted enabling a quick location of the passenger compartment 40 to provide for a quick rescue. The passenger compartment 40 flotation could be accomplished by encapsulating the passenger compartment with a flotation media which can be activated after or before the aircraft 10 impacts the water. The flotation material would preferably also allow the passenger compartment 40 to withstand three hundred and sixty (360) degree rolls in high seas. It is further envisioned that in addition to flotation material between the passenger compartment and the aircraft fuselage, shock absorbers also could be installed in order to minimize any type of shock during rough landings or crash landings. In another embodiment, foam would be placed around the passenger compartment between the aircraft outer skin and the passenger compartment 40. The foam would be designed to swell very quickly when exposed to water. The swelling of the foam would, in turn, cause specially designed rivets to pull loose from the outer skin to allow the passenger compartment 40 to float to the surface so rescue could occur. Preferably, conventional GPS beacons would send, via satellite, the location of the passenger compartment 40 along with the flight number and the number of passengers on board. Further, radio transmission from the cockpit 12 or crew area could still be utilized if not damaged in the initial crash. It should be understood that the passenger module 40 could also be a series of interconnected independent modules which would preferably be configured with sealing doors between such independent modules to provide for separation when desired such as for, but not limited to, security or safety reasons.

Figure 8:
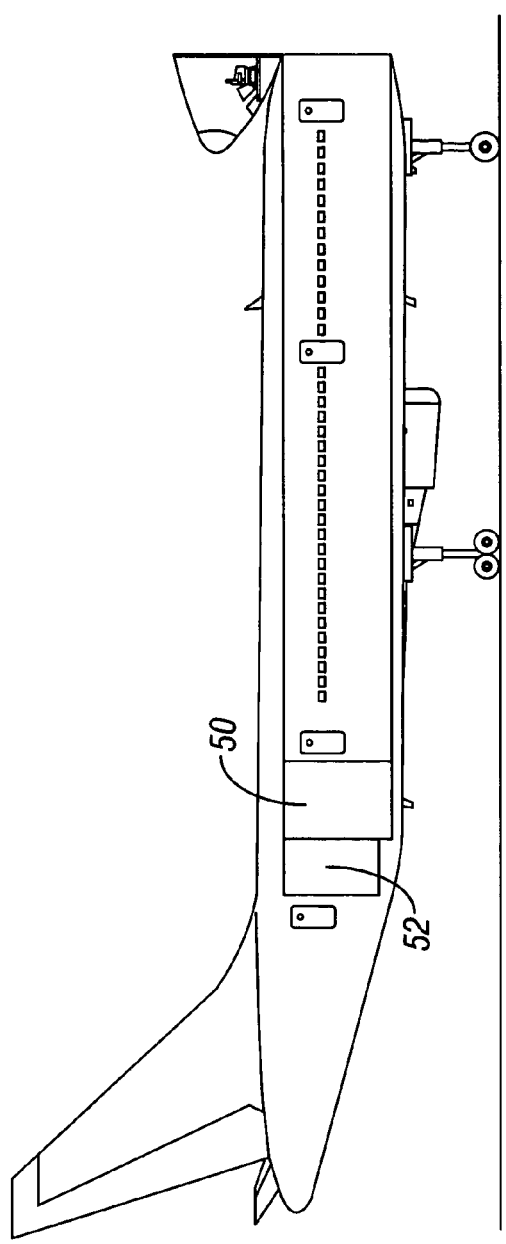
FIG. 8 illustrates an embodiment of the improved passenger aircraft further illustrating adjustable landing gear, a lavatory module, and a food module.

FIG. 8 illustrates the compartmentalized food module for the improved aircraft 10. It should be appreciated that the food module 50 may consist of more than one module 50. Further, the modules could be placed together toward the rear of the aircraft 10, may be, placed in the rear and the front, or any other convenient location within the aircraft. It should be noted that if the food modules 50 could be incorporated within the passenger compartment 40 and adapted to be easily removed from or installed into the passenger compartment 40. In an embodiment wherein the passenger compartment 40 comprises more than one section, the food modules could be placed between the individual passenger compartments 40 and thus removed or loaded at the same time that the passenger compartments 40 are loaded or unloaded. The food module 50 would preferably be stocked or serviced inside of the terminal 30. This would reduce the time required for current design or current system food service trucks which have to load and unload the aircraft 10. Preferably, all loading and unloading of food would be done in the terminal 30 and, of course, could be done without waiting for the scheduled departing aircraft 10 to be at the terminal 30 or for the aircraft waiting for completion of food servicing. Further, with the food module 50 in place on the passenger compartment 40a or in between multiple passenger compartments 40a, passengers already seated on the waiting passenger compartment 40 for the next flight could easily be served while the passenger compartment 40a is within the terminal 30.

Further, since food service trucks would be eliminated due to the compartmentalized food modules 50, the food could be prepared in the terminal 30, possibly in a level below the passenger level (not shown) and the modules 50 could be brought up directly to where they would be loaded on the passenger compartment 40a or loaded onto the aircraft 10 with the passenger compartment 40a. Still further, the preparation of the food and food modules 50 may be performed near the check-in building 36 (FIG. 10) or in an upper or lower floor of the check-in building 36. Thus, the food modules could be loaded concurrently with a passenger compartment 40 during the passenger check-in process. This could further enhance security as fewer persons, including, independent contractors have access to the aircrafts and the terminal areas. Another advantage would be that beverages or snacks could be provided to passengers after they have been seated in the modules 40 but before the passenger modules 40 are transported and loaded onto the aircraft 10.

FIG. 8 further illustrates a lavatory module 52. As with the food modules 50, the lavatory modules 52 may be placed in one or more locations in the aircraft 10. With the lavatory modules being similarly compartmentalized, they would be removed from the aircraft 10 at the same time as the passenger compartment 40 or baggage compartment 55 (FIG. 9) was removed. The lavatory module 52 would preferably be a conventional self-contained module with suitably sized holding tanks (not shown). Once in the terminal 30, the lavatory module 52 may be separated from the passenger compartment 40 and moved along track 42c (FIG. 5) to the side of the terminal 30. Preferably, the lavatory module 52 would be connected to the holding tanks 46 wherein the lavatory module 52 would be emptied and sanitized. It should be noted that the connection to the holding tanks 46 is not described in detail as the emptying of the lavatory module tanks is preferably by a conventional vacuum system employed in cleaning such facilities. Further, holding tanks 46 are preferably connected to empty the gray and black water tanks into existing terminal plumbing. It is also envisioned that instead of a conventional gravitational flow system, holding tanks 46 can be emptied utilizing a negative pressure plumbing system, illustrated as 46a, in FIG. 5A. Thus the waste would not accumulate in areas having a close proximity to passengers. It should be appreciated that the lavatory module 52 may be directly connected to the negative pressure plumbing system 46a and the holding tanks 46 may be eliminated. Still further, lavatory module 52 may remain with the passenger compartment 40. In this embodiment, the passenger module 40, after being removed from the aircraft 10, will be positioned near the holding tanks 46 and/or the negative pressure plumbing system 46a for emptying and sanitation. To further, reduce any possible passenger discomfort, the passenger compartment or module 40, may be moved to the holding tanks 46 and/or the negative pressure plumbing system 46a after the incoming passengers have exited the passenger module 40 and before the departing passengers begin taking their seats. It should further be appreciated that the sanitization of the lavatory module could still be accomplished by actual personnel or by a conventional automated system. When the lavatory modules 52 are cleaned, they are preferably moved and stationed along with the passenger compartment 40a for placement in the next available aircraft 10. An advantage of the use of the holding tanks 46 and/or the negative pressure plumbing system 46a is an elimination of a sanitary truck which must currently service substantially all of the aircraft thus further reducing traffic and personnel around the outside of the aircraft 10.

Figure 9:
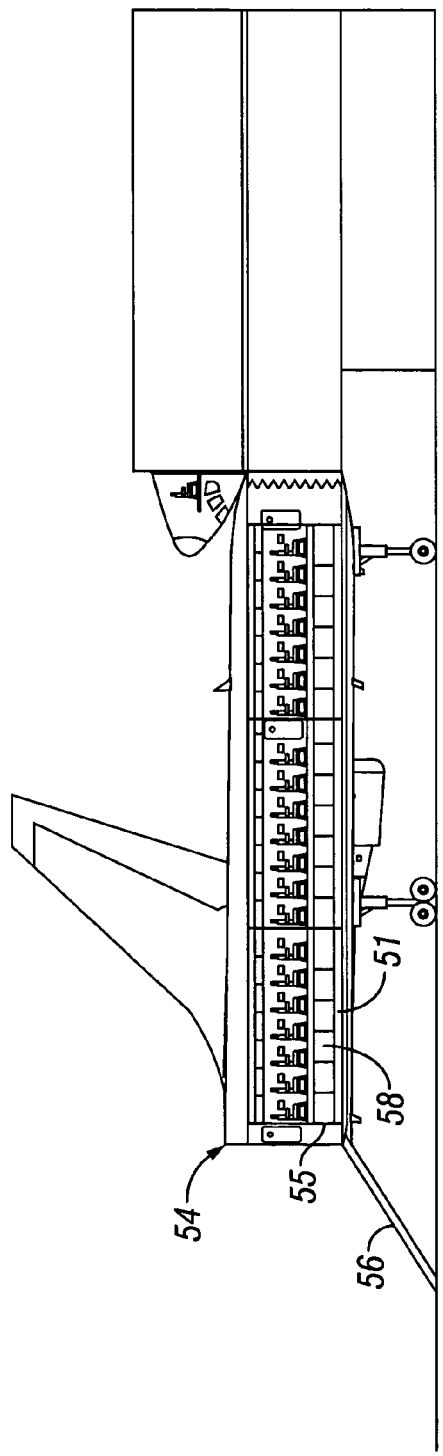
FIG. 9 illustrates an aircraft docked at the terminal with a rear cargo door.

As illustrated in FIG. 9, the baggage would preferably also be compartmentalized, however the luggage module 55 would preferably be removed from the tail end 54 of the aircraft 10. Passenger aircraft 10 would preferably have a cargo door 56 at the tail end 54 which would drop down like a ramp or raise up as described herein. The luggage module 55 could then be pulled out by pulley, on tracks, on air, or by other suitable means and taken to the baggage claim area (not shown).

It is envisioned with this concept that passenger luggage would be loaded directly into cargo storage bins 58 when the luggage is checked in. When the cargo storage bin 58 has been filled, it will be moved directly to the aircraft 10 to be loaded. Thus, the luggage would be handled less and would be moved in a cargo fashion, preferably preventing damage, mishandling and lost bags.

In another embodiment of the present system, luggage would become standardized, thus suitcases would all relatively be the same size or only a few sizes. Therefore they could be more easily put into the cargo bins 58 and loaded. Preferably, this efficiency will also decrease the time to handle baggage and also help prevent loss and mishandling. Thus, the standardized luggage and/or cargo bins 58 could be handled by a conveyer system (not shown) and by machinery rather than people which, in turn, should also reduce cost of operating the airport and also the cost of mishandled or damaged luggage or cargo.

Typically, many aircraft 10 scheduled cargo which has preferably been scheduled in advance of the aircraft 10. This allows time to pre-pack the scheduled cargo into the baggage module 55 or the cargo bins 58 by weight. Thus, the weight can be spread in the aircraft cargo bay 51 to balance the aircraft 10. Thus, when the aircraft 10 arrives, the cargo can be set and balanced and then the luggage which typically arrives just before the aircraft 10 is fully loaded can be inserted with the pre-packed baggage module 55. Therefore, as soon as the arrival aircraft's 10 luggage module 55 and/or cargo bins 58 are removed, and the new cargo, already in the luggage module 55 or in cargo bins 58 can be placed into the aircraft. Preferably, this minimizes delays in loading the aircraft.

Figure 14:
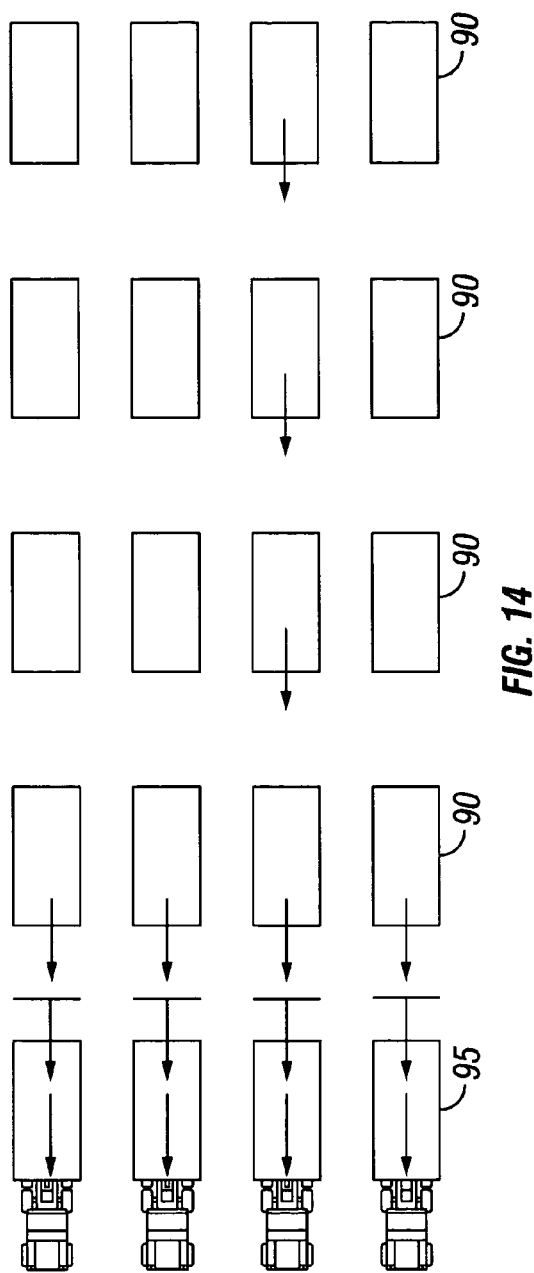
FIG. 14 illustrates an embodiment of the present invention as applied to cargo loading of trucks and trailers.

It should be appreciated that the same principle of cargo loading could be used in the trucking industry. As illustrated in FIG. 14, an example would be to prepare an entire truckload of cargo, have it packaged and wrapped on modules 90 and skids, that can be slid, rolled, pushed or pulled into the truck 95. It should be understood that tracks, as described herein regarding the passenger module could also be utilized for loading and unloading the cargo modules 90. This would greatly speed up the process of loading and unloading, as when a truck 95 arrives the cargo module 90 arriving on the truck can be pulled out and the next module 90 placed therein, thus eliminating traffic at dock doors. This would also save on fuel consumption and tying trucks up and shorten delivery times.

Another modular embodiment, of the present invention, is the use of a modular fuel tank or tanks. In this embodiment, conventional aircraft fuel tanks would be detachable. Thus, when the aircraft 10 lands, the fuel tanks could be easily exchanged for pre-filled tanks. It should be appreciated that the use of modular fuel tanks could aid in reducing ground contamination due to fuel spills, reduce the number of service vehicles for an aircraft 10 as well as further reduce the aircrafts time at the terminal.

FIG. 10 illustrates another embodiment of the present system wherein the layout of the conventional airport would preferably be changed. These changes may include, but are not be limited to, moving all passenger entry buildings 36 away from terminals 30. Therefore, the terminals 30 would be secluded preferably in the center portion or some portion of the airport 100, preferably far from moving traffic. Preferably, it would be possible for airports 100 to purchase property with a five to ten mile diameter or right of way. Therefore, there would be a safety zone between the arrival 37 and departure 36 buildings, which would be located on the outskirts of the airport 100 and the terminals 30, which would be located near the middle of the airport 100. This safety buffer zone around the airports 100 would further enhance security. The terminal 30 could actually be placed far away from the buildings 36 where passengers will check in their luggage, purchase their tickets and/or check in for flights. It should be appreciated that such a layout would greatly increase security in that it would substantially reduce the possibility that people, cars, trucks or other equipment, which may possess some type of threat to the airport 100 or aircraft 10, to move within a proximate distance of the aircraft 10 or the terminal buildings 30. Therefore, vehicular traffic within the airport area would preferably be at a minimum thus reducing the vehicles that are on the airport property and aiding in decreasing the cost for airport security. The only vehicles would be authorized emergency vehicles, official airport vehicles, such as, but not limited to, maintenance and supervisory vehicles, and the passenger trams or trains 38, 38a. Further passenger check-in would be located near a parking area 41. Parking areas 41 could further comprise multi-story parking garages as well as flat lots or a combination thereof, as well as parking areas 41*a* utilized by rental car companies which allow parking for airline passengers. Here, passengers would be completely screened, baggage would be completely screened, all check-in procedures would be accomplished, including seat assignments, aircraft assignments, and any other needed work, such as but not limited to the screening of food modules 50 prior to loading in the passenger module 40 or the aircraft 10. Passengers would then be moved by train 38 or monorail, moving sidewalks, trams, and/or the like and transported to the terminal 30 of their choice. Having passengers and baggage screened far from the terminal 30 helps ensure that preferably all baggage and customers who actually enter the terminal 30 will be safe and pose no security threat to other passengers or aircraft 10.

In an alternative embodiment, it could be possible to have passenger compartment 40 and 40*a* loading and unloading areas at or near the entry buildings 36. In this embodiment, passengers would be directed directly to their passenger compartment 40*a* and seated, and then the entire compartment 40*a* would be transported to the terminal 30 and to the awaiting docked aircraft 10. The passenger compartments 40*a* would then be loaded directly into the aircraft 10 as described herein above. Further, de-planing passenger compartments 40 would be transported directly from the terminal 30 to the entry buildings 36.

It should be appreciated that in embodiments wherein the passenger compartments 40 are staged in the terminal, once the passenger compartment 40 has reached a deplaning area, the passengers have left and have gathered their carry-on luggage, they will be moved by moving sidewalks, preferably to trains, which will then take them to an arrival building 37 (FIG. 10). The arrival buildings 37 are preferably adjacent to the check-in buildings 36. However, it should be understood that the arrival building 37 and the check-in building 36 can be separated, can have the parking areas 41, 41*a* separating them, or can be otherwise configured and still remain within the scope of the present invention. The arrival building 37 preferably comprises any necessary immigration check, baggage pickup, baggage check, and the like. The passengers can then be moved by moving sidewalks, trains, trams, monorails, and the like to the parking area 41. An additional embodiment of the airport system would include immigration check while on the trams, trains, monorails, or other means of transportation to the arrival building 37. Therefore, passengers can have their documents inspected as well as carry-on luggage inspected before they come to the arrival building 37. Thus, at the arrival building 37, they will pick up their check-in luggage and finish any immigration check. It is further envisioned that with computer checks on luggage tags, the immigration check may be done on the cargo luggage prior to the passenger arriving at the immigration checkpoint at the arrival building 37. Therefore, the luggage would be ready to pick up unless there has been some flag or some further inspection required.

Further, the cargo modules 55 (FIG. 9) could be preloaded at the entry building 36 and moved to the correct aircraft 10 and loaded on the aircraft 10. It should be further appreciated that with this concept, the cargo could be moved last, therefore if some passenger is not in their assigned seat in a passenger compartment 40*a*, their luggage simply would not be loaded. Again, this would help improve security and protect the aircraft against threat.

In another embodiment, the cargo or luggage modules 55 could travel with the passenger module or compartment 40 and be separated off, or spurred off to another track, as illustrated in FIG. 10, and move directly to the aircraft 10 as the passenger compartment 40 moves into the terminal 30.

Figure 11:
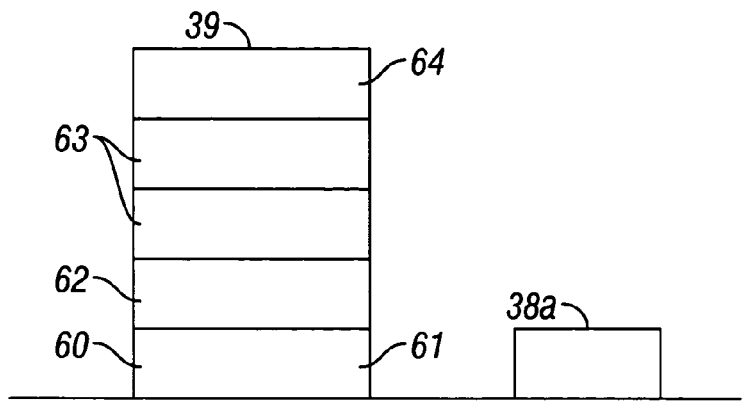
FIG. 11 illustrates side view of a food court tower.

A further embodiment of the airport layout improvement will be the eating area or concession area. It is envisioned in this embodiment that all restaurants could be located in a single building 39 removed from the terminal 30, yet easily accessible by train 38*a*, monorail, moving sidewalk, or the like. As illustrated in FIG. 11, the building 39 could be arranged such that shopping 60 and concession areas 61 could be on one floor. Fast food restaurants 62 or snack areas could be on a subsequent or different floor. Sit-down restaurants 63 could be arranged on upper floors. Thus, it is envisioned that possibly a food-court tower 39 could be made such that each subsequent rising floor would be a higher class restaurant, so that people who prefer to eat in a sit-down restaurant 63 or five-star restaurant 64 could move directly to an upper floor. This, in turn, would reduce congestion and also make it easier for passengers to find the exact food, snack or concessions that they desire. Another advantage is that not having any food outlets in the terminal 30 will lessen congestion, in the terminal 30 and further keep passengers from wandering away from their passenger module 40. Further, substantially all of the persons in a flight area will be either arriving/departing passengers or airport/airline employees thus further enhancing security since persons in the flight areas will be accounted for.

Figure 10A:
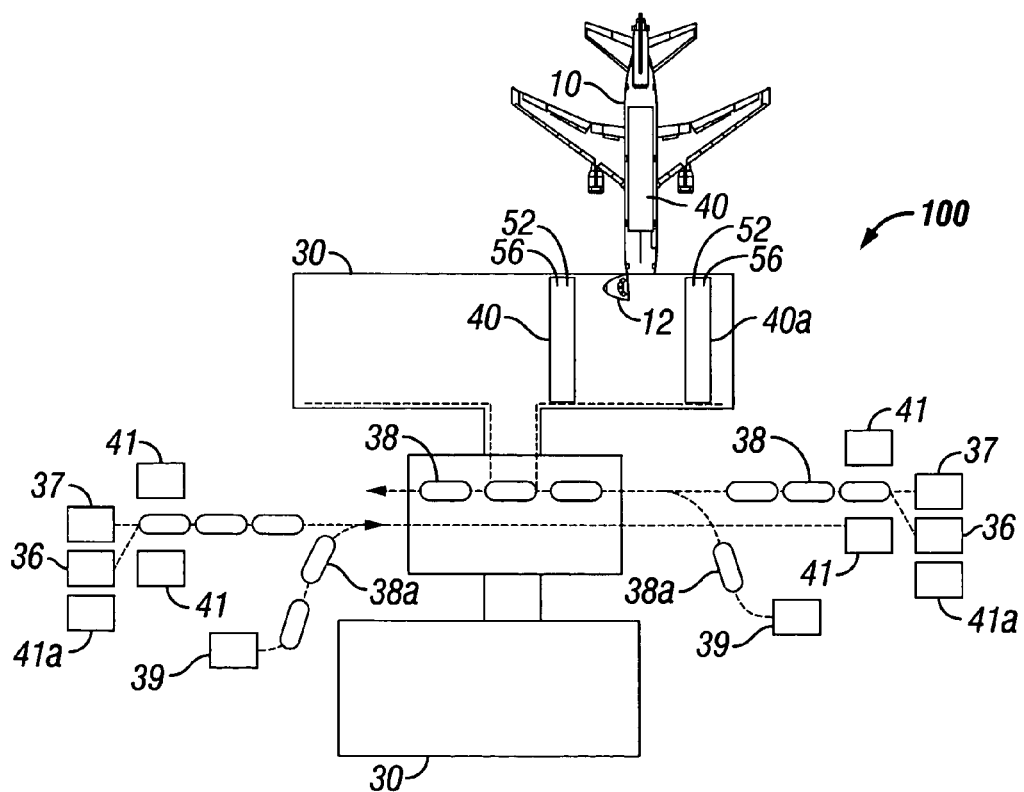
FIG. 10A illustrates another embodiment of a layout of an airport wherein the terminal building is located away from arrival and departure buildings.

It should be appreciated that the airport 100 could be configured so as to have multiple check-in or departure buildings 36, arrival buildings 37, and parking areas 41 and 41*a* (see FIG. 10A). Preferably such additional buildings 36,37 and parking areas 41, 41*a* would be located on opposite sides of the airport 100 or at least in differing quadrants of the airport 100 to alleviate congestion. Similarly, there could be a food court tower 39 adjacent to other departure buildings 36 and arrival buildings 37. However, the preferred embodiment of the food court tower 39 would be to have only one building and have high speed trams dedicated to moving people between the food court tower 39 and the departure 36 and arrival 37 buildings. It should be appreciated that passengers would travel to and from the food court tower 39 prior to proceeding to the passenger module 40 and the terminal 30.

Although, it is envisioned that most people movement would be via trains, trams, monorail and the like, it may be virtually impossible to eliminate passenger walking even with moving sidewalks. In such circumstances, it is envisioned that where tram, train, passenger module, or other tracks are laid in areas open to passenger walking, the tracks will preferably be spring loaded or controlled through actuators to move together, be covered, or a combination thereof. Thus, after a tram or train has passed a particular area the tracks, controlled by a conventional computer system and conventional sensors, will close by moving together or have a floor mounted cover move over them. When another train or tram approaches the tracks, the cover moves away and/or the tracks move apart so as to support the tram or train. While the tracks are closed or covered, walking passengers can easily traverse the track areas with out tripping or falling on the tracks.

Figure 12:
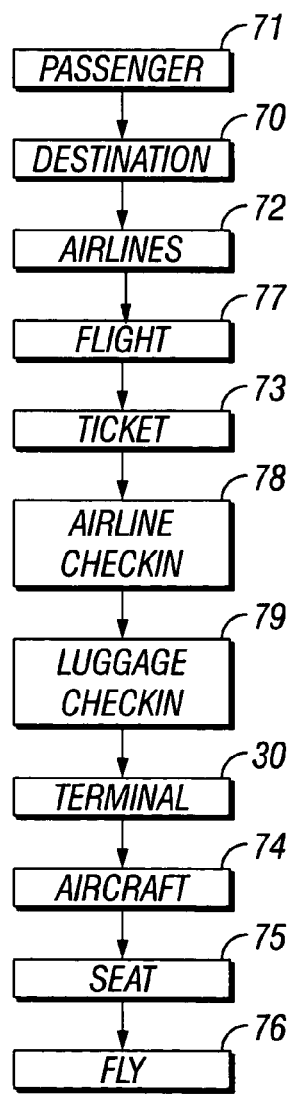
FIG. 12 illustrates the steps of utilizing a common aircraft.

FIG. 12 illustrates the steps of another embodiment of the present system which would preferably utilize a common use aircraft concept. It should be appreciated that with a common use aircraft concept, there will be a reduction in the total number of aircraft 10 flying through the skies at a given time to the same geographical area. As an example, not intended in a limiting sense, several airlines may currently fly, from a particular departure city to a major destination. These airlines may have aircraft departing within minutes of each other and are many times flying below full passenger capacity. The instant embodiment will preferably allow for only one or two aircraft, which are flying at full capacity, to travel to the same destination within minutes of each other. Thus, the air routes would be less crowded, preferably easing air travel congestion and provide for more efficient and safer air traffic control. It is also envisioned that with less air congestion, pilots may be able to chart their own course and not use the common airways of the present system. Therefore, the path of the aircraft 10 would be more direct from city to city, thus reducing the actual air time that the aircraft 10 must spend in traveling. It should also be understood that the reduction of aircraft would also reduce the staffing requirements for the airlines and airports as fewer staff personnel would be needed to man the counters and gates, service the aircraft, serve the passengers, as well as fly the aircraft.

Still referring to FIG. 12, there will no longer be aircraft designated for a particular airline 72. All aircraft 74 can be utilized by all airlines 72. For instance, an aircraft 74 destined to travel to some pre-determined destination 70, such as New York. In this example, there will basically no change for passengers 71. Passengers 71 will still book their flight 77 to the desired destination 70 such as New York and book their tickets 73 as is conventionally done. The change will be for the airlines 72. Each airline company 72 can bid on or otherwise reserve the number of seats 75 that will be offered on the aircraft 74 which is destined for a particular destination 70. Each airline 72 that normally travels to the destination city 70, such as New York in this example, would have a selection of seats 75 based on the current number of flights and passenger load which they carry to that destination 70. Passengers 71 would still select a particular airline 72 to buy their tickets from, however it is envisioned that the prices will be more stable among airlines 72 as they still compete to have passengers 71 on their portion of the flight 77. After an airline 72 has sold out its block of seats 75, it will have the option of choosing more seats 75 once other airlines 72 have booked their portion or are unable to book their portion. In this example, all passengers 71 with tickets 73 for a particular timed flight to a destination 70, for instance New York, regardless of the airline 72 they purchased the ticket 73 from, would come to the airport to board their flight 77. These passengers would proceed to the particular airline check-in 78, check in their luggage 79, and also purchase their tickets 73 or pick up their tickets 73. Check-in luggage would be routed to the terminal 30 of the aircraft 74 that is going to the destination 70 and would then be loaded onto cargo bins 58 and loaded into the aircraft 74 as described herein above. Passengers 71, regardless of the airline company ticket 73 that they hold, would proceed to the boarding area and would board in the passenger compartment 40 a in their designated seats 75. It should be appreciated that with a system such as this, terminals 30 would be arranged by destination cities 70 rather than be arranged by airline companies 72. This would make it much easier on passengers 71 who were late for a flight 77 or could not board a flight 77, or for some reason have to change flights 77. They would be in a terminal 30 where all of the flights are going to their destination city 70. It should further be appreciated that with such a system, most aircraft 74 would be airborne with the maximum capacity of passengers 71. Thus, in the long run, this would reduce fuel cost and fuel consumption as well as save maintenance on aircraft and possibly require fewer aircraft. Still further, with the boarding concept of the passenger compartment 40, 40a, more flights 77 could depart for the same destination 70, therefore several fully loaded aircraft 74 could depart for a destination 70 within a reasonable time period. Preferably, the only constraint would be airport traffic. Thus, instead of possibly three or four aircraft 74 traveling in an under capacity situation to the same destination 70 at substantially the same time, substantially full aircraft 74 would travel to the destination 70 but in fewer number. Preferably, passengers 71 participating in such a concept could still retain their favorite airline company and also draw miles or whatever other rewards or perks they desire.

In another embodiment, it is envisioned that as most modern aircraft and also the new designed aircraft 10 would have conventional television monitors on the back of each seat. Therefore, passengers could easily access the television monitors. The monitors would continually show flight information, information on other flights for people who are trying to connect, as well as show travel options to various destinations. Thus, passengers could actually plan new vacations while they are flying. They could purchase the tickets online, select locations and the like. It is envisioned that such marketing to a captive audience would be very effective.

In another embodiment of the airport system, preferably there would no longer be ticket counters at the departure areas. Passengers would purchase tickets online or at some convenient location around their city and would then be given a pin number, a computerized card, or other suitable identification means, such as but not limited to finger prints, bone scans, eye scans, voice recognition, and the like, could be used to provide positive identification of the passenger. Therefore, passengers could check in by sliding their card, inputting their pin number, or providing any other pre-determined positive identification scheme when they arrive at the departure building 36 or the passenger and luggage screening area.

With the new design of the airport terminals 30, the terminal 30 would now be able to accommodate more aircraft 10 than the conventional airport terminal. Typically, the terminal and the loading bridges limit the space availability of the aircraft. With the new aircraft docking design, the distance between docking doors would only be limited by the size of the aircraft 10. Therefore, it is envisioned that the aircraft 10 through their hydraulic landing front 15 and rear 16 landing gear, as described herein above, could be adjusted either up or down in order to accommodate more aircrafts 10 at the terminal 10. Therefore the aircraft 10 could preferably be lowered to a position wherein its wings will fit underneath the wings of the adjacent aircraft 10, or vice versa. It should be appreciated that with such a design, the aircraft 10 would have to reach such a level of the docking doors prior to moving within proximity of the adjacent aircraft 10 in order to avoid any unintended contact or damage. In such a case, it would be preferable to have some type of conventional winch or track system (not shown) which would move the aircraft 10 to the dock after the aircraft has adjusted its height. It should be appreciated that the same manner of docking could be accomplished with aircraft designs that embodied foldable wings or retractable wings (not shown). In either case, the desired result, the aircraft 10 would be able to dock closer to one another and therefore a terminal 30 could accommodate more aircraft 10. Further, due to the reduction of passengers milling about the terminal 30, there would be more room for the passenger compartment deplaning area or boarding area.

Figure 13:
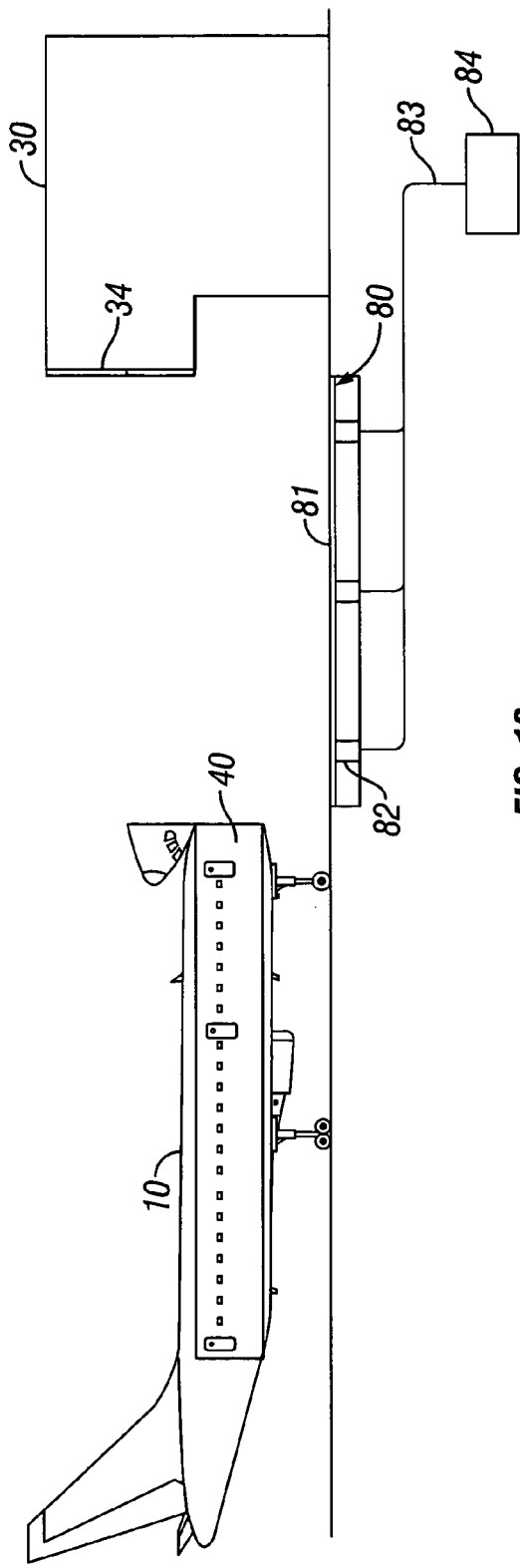
FIG. 13 illustrates an adjustable docking platform.

In another embodiment, illustrated in FIG. 13, an alternative method to adjust the docking height of adjacently docked aircraft 10 is a floating or adjustable dock station, wherein the docking station 80 is preferably an elevator or scissor lift. Preferably, the docking station 80 could comprise a platform 81 which can be raised or lowered using a system of conventional hydraulic lift cylinders 82. These conventional hydraulic lift cylinders would preferably be powered and controlled via conventional hydraulic lines 83 and conventional hydraulic pumps, motors and controls (designated with the numeral 84). The docking station 80 could be raised or lowered until the height of the platform 81 was substantially level with the bottom of the passenger compartment 40. The passenger compartment 40 would then be moved out of the aircraft 10, as described herein above, onto the platform 81. The platform 81 would then preferably be raised or lowered so as to be aligned with the floor of the terminal 30. The passenger compartment 40 could then be moved into the terminal. It should be appreciated that when utilizing this embodiment, the passenger compartment must remain protected from the elements. Such protection can comprise a permanent, retractable, or other suitable cover attached to the terminal 30 (not shown). The same docking station would preferably be used to move the next passenger compartment 40a into the aircraft 10.

Figure 13A:
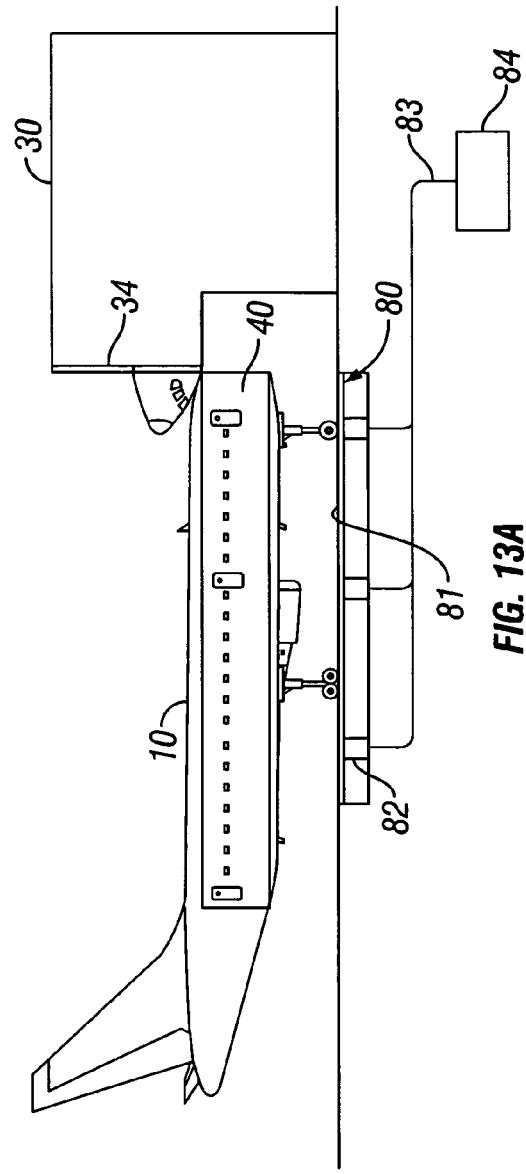
FIG. 13A illustrates another embodiment of an adjustable docking platform.

FIG. 13A illustrates another lift system wherein the aircraft 10 parks atop of the platform 81. In this embodiment, substantially the entire aircraft is raised to the proper height for docking.

Figure 13B:
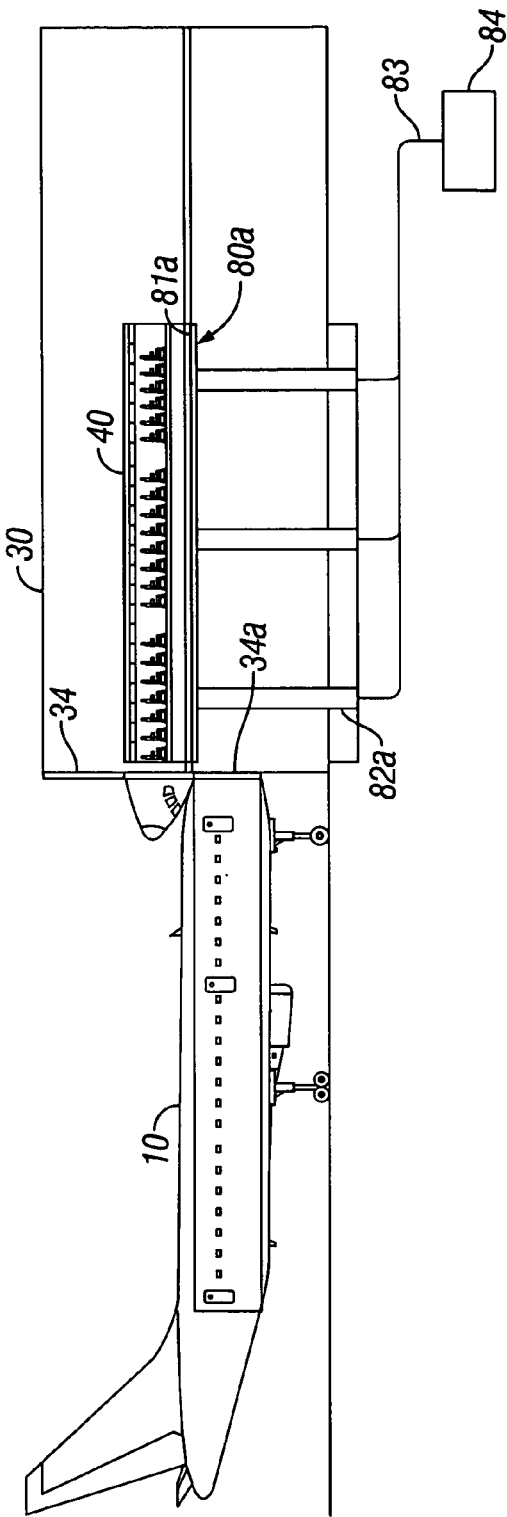
FIG. 13B illustrates another embodiment of an adjustable docking platform.

FIG. 13B illustrates an embodiment which is preferably utilized with low height or low profile aircraft at airports where an outside lift station is impractical for any variety of reasons. In this embodiment, the terminal will preferably have a lower dock opening 34a. It should be appreciated that the terminal 30 may have both a lower level opening 34a as well as an upper level opening 34. As the aircraft 10 docks at the lower opening 34, in a manner similar to that described herein, a docking station 80a can be adjusted so as to accept the passenger compartment 40. After the passenger compartment 40 has been moved fully out of the aircraft 10 and onto platform 81a, the platform 81a can be raised to the terminal level. When the platform 81a reaches the terminal level, the passenger compartment 40 may be moved as desired within the terminal 30.

In another embodiment, the ramp area, where the aircraft 10 docks, could be lowered or inclined to allow the aircraft to align with a terminal 30 that is above or below the level of the passenger compartment. It should be appreciated that a combination of a raised or lowered ramp with the hydraulic docking station 80 described herein above could be used to efficiently dock the aircraft. Another embodiment would be a floatable ramp wherein the ramp raises or lowers the entire aircraft 10. The raising or lowering of the ramp may be accommodate through the use of hydraulics, air bags, elevators, scissor lifts and the like.

It should be appreciated that the redesign of the terminal 30 and the aircraft 10 can be substantially accomplished through attrition. The newly designed airport terminals 30 may also contain portable loading bridges or loading bridges that can be adapted to the docking doors. Therefore, aircraft with the traditional side entry can still be accommodated while the aircraft are being changed out through attrition. Thus, it is envisioned that an aircraft fleet will preferably consist of the newly designed aircraft 10 with the opening nose cone section, the traditional aircraft with side entry and exit, and possibly with a combination thereof. As the fleet matures and the old style aircraft are removed from service, the portable loading bridges which fit into the docking doors can also be removed, and therefore the terminal 30 will now accommodate the newly designed aircraft with the movable nose cone section and or tail section. It should be appreciated that the new designed aircraft 10 may have both the nose or cockpit area 12 that open as well as the rear cargo door 56 (FIG. 9). Further, the aircraft 10 will preferably be equipped with the conventional side doors which can be used for loading and unloading passengers by loading bridges, ladders, stairs, or the like to accommodate use in airports that either have not upgraded their terminals or do not have the passenger traffic to justify the expense of re-modeling the terminals.

It may be seen from the preceding description that a novel airport system for operations, safety, and security has been provided. Although specific examples may have been described and disclosed, the invention of the instant application is considered to comprise and is intended to comprise any equivalent structure and may be constructed in many different ways to function and operate in the general manner as explained hereinbefore. Accordingly, it is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A passenger compartment for use in an aircraft for an improved airport system comprising:
   an aircraft, having an interior and an exterior;
   a plurality of seats detachably affixed to a frame, said frame being disposed below said plurality of seats, wherein said frame does not depend on any extension of said frame to surround said plurality of seats and provides for unobstructed access to each seat of said plurality of seats; and
   said frame being detachably mounted within the interior of the aircraft, wherein said frame is attached to a bottom portion of the interior, and wherein said frame may be removed from the aircraft, and wherein said plurality of seats may be removed from the aircraft with said frame, and,
   a track mounted within said aircraft onto which said frame is slidably mountable wherein said track allows the frame to be moved into and out of said aircraft,
   wherein each side of the compartment is substantially open when removed from said aircraft, so the plurality of seats are accessible from the exterior of the compartment when the compartment is removed from the aircraft.

2. The passenger compartment of claim 1, wherein said passenger compartment comprises more than one independent and interconnectable module.

3. The passenger compartment of claim 1, wherein said track system is a winch type system, and further wherein a cable is provided for moveably engaging said passenger compartment.

4. The passenger compartment of claim 1, further comprising a lavatory module detachably mounted to said frame, wherein said lavatory module may be removed from the aircraft with said frame.

5. The passenger compartment in claim 1, further comprising a food module detachably mounted to said frame, wherein said food module may be removed from the aircraft with said frame.

6. The passenger compartment of claim 1, further comprising an overhead storage bin fixedly attached to the interior of the aircraft above said seats, wherein said overhead storage bin remains within the aircraft when said frame is removed.

7. The passenger compartment of claim 1, further comprising an overhead storage bin fixedly attached to said frame above said seats, wherein said overhead storage bin may be removed from the aircraft with said frame.

8. The passenger compartment of claim 1, further comprising:
   a sub-floor mounted to said frame, wherein said sub-floor defines a space between said sub-floor and bottom of said frame for storage, and wherein said sub-floor having pivotally mounted doors therewithin; and further wherein said sub-floor may be removed from the aircraft with said frame.

9. The passenger compartment of claim 1, further comprising passenger access for ingress and egress from more than one side of the passenger compartment.

10. The passenger compartment of claim 1, further comprising
   a sub-floor, having an outer surface, mounted to said frame wherein said sub-floor defines a space between said sub-floor and bottom of said frame for storage.

11. The space defined between said sub-floor and bottom of said frame of claim 10, further comprising at least one sensor, wherein said sensor detects the presence of an article within said space.

12. The passenger compartment of claim 10, further comprising at least one pivotally mounted door affixed to said sub-floor, wherein said at least one pivotally mounted door communicates between the outer surface of the sub-floor and said space defined by said sub-floor and the bottom of said frame.

13. The at least one pivotally mounted door of claim 12, further comprising a seat attached to said at least one pivotally mounted door, wherein said seat may be tilted upward to open said at least one pivotally mounted door.

14. The at least one pivotally mounted door of claim 12, wherein said at least one pivotally mounted door is positioned in a direction away from a seat towards the forward end of an aircraft.

15. The passenger compartment of claim 10, further comprising at least one row of seats fixedly attached to said outer surface of said sub-floor.

16. A passenger compartment for use in an aircraft for an improved airport system comprising:
   an aircraft, having an interior and an exterior;
   a plurality of seats detachably affixed to a frame, said frame being disposed below said plurality of seats, wherein said frame does not depend on any extension of said frame to surround said plurality of seats and provides for unobstructed access to each seat of said plurality of seats; and
   said frame being detachably mounted within the interior of the aircraft, wherein said frame is attached to a bottom portion of the interior, and wherein said frame may be removed from the aircraft, and wherein said plurality of seats may be removed from the aircraft with said frame, and
wherein said compartment is rotationally attached to said aircraft, wherein a gyroscope controls rotation of said passenger compartment to keep said compartment level.

* * * * *